Patented May 30, 1939

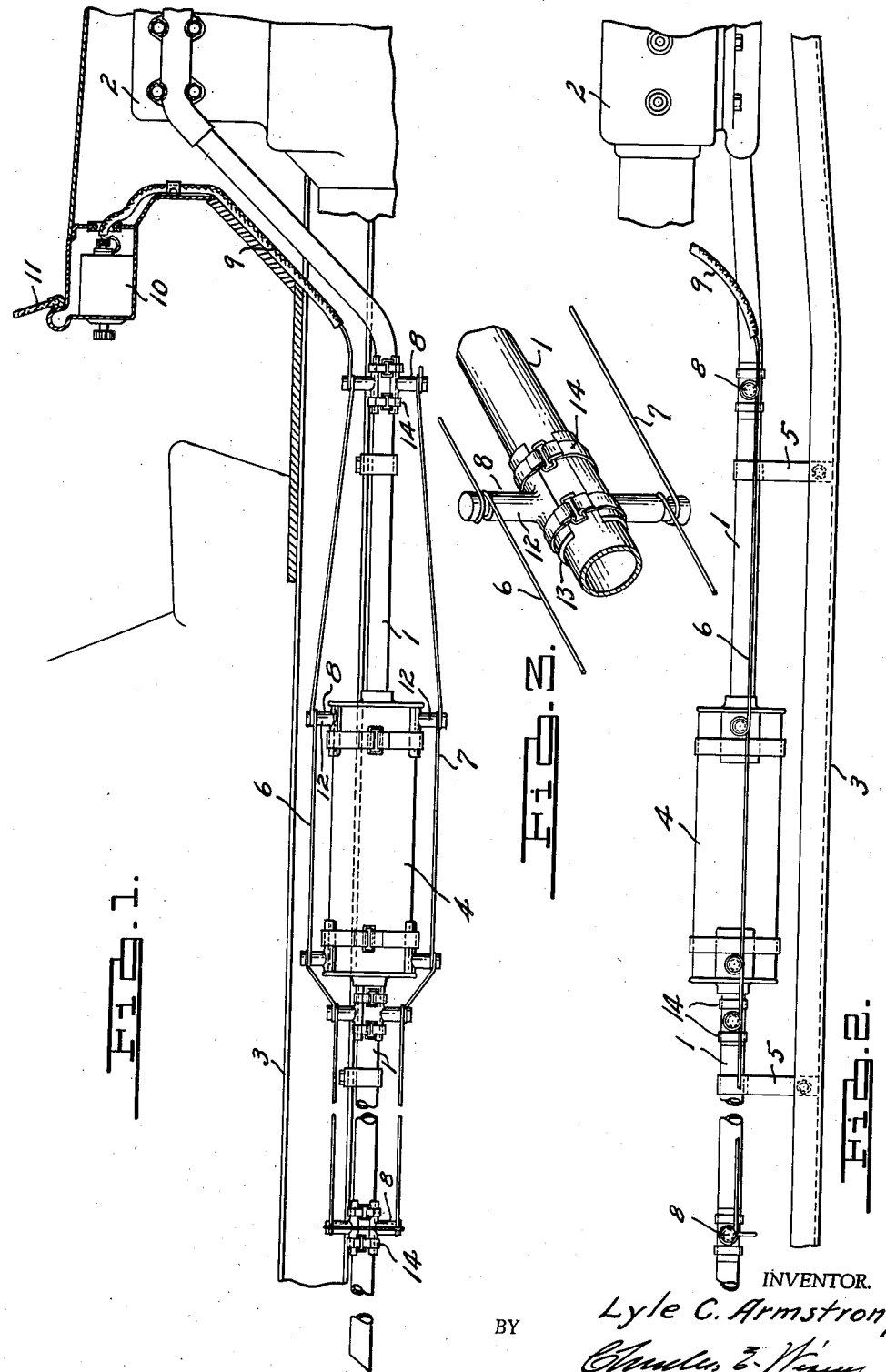

2,160,192

UNITED STATES PATENT OFFICE 2,160,192

AUTOMOBILE AERIAL

Lyle C. Armstrong, Detroit, Mich.

Application November 11, 1936, Serial No. 110,210

2 Claims. (Cl. 250—33)

This invention relates to automobile radio aerials, and an object of the invention is to provide an aerial wire associated in sufficiently close proximity to the exhaust conduit and muffler of the engine of the automobile as to be maintained practically free from moisture or accumulation of ice.

The structure consists in the provision of a wire extending longitudinally of the exhaust conduit and muffler preferably in a series of loops and maintained in insulated relation therewith in a manner to prevent material capacity coupling between the aerial and the metal parts of the automobile.

A further feature and object of the invention is to provide an automobile aerial that is simple and inexpensive to manufacture that may be readily mounted on the usual exhaust conduit of an automobile engine.

These and other objects and various novel features of the invention are hereinafter more fully described and claimed, and the preferred form of construction of an aerial for an automobile radio embodying my invention is shown in the accompanying drawing in which—

Fig. 1 is an elevation of the exhaust conduit and showing a portion of the automobile parts supporting the same and further showing my improved aerial associated therewith.

Fig. 2 is a plan view.

Fig. 3 is a perspective view showing a pair of insulators for supporting a two loop aerial on the exhaust conduit.

The automobile parts here shown are simply to illustrate a typical installation which will vary somewhat, depending upon the position of the exhaust conduit in relation to other portions of the vehicle, it being understood that a number of variations may be made in the relationship of the automobile parts and in fact in the arrangement and method of mounting of the aerial on the exhaust conduit without departing from the spirit and scope of the invention as herein described and claimed.

In the structure shown, the exhaust conduit is shown at 1 and extends from the side of the engine, indicated at 2, and connected to the exhaust manifold of the engine in the usual well known manner. This conduit extends to beneath the floor of the automobile and the exhaust conduit is supported by the side frame 3 of the automobile. The exhaust conduit has intermediate its length the usual muffler 4 and the brackets 5 are attached to the frame 3 extending inwardly therefrom as will be understood from Fig. 2 and support the exhaust conduit.

The aerial is here shown as consisting of a plurality of wire loops 6 and 7, the wire 6 being on the upper side of the muffler and the wire 7 on the lower side. A greater or less number of loops may be mounted depending upon the desired capacity. Each of the wire strands is supported by insulators 8 of which there are a number along the exhaust conduit and muffler after the manner shown. These insulators may be of any approved type and space each of the respective loops of the aerial a distance from the muffler sufficient to prevent any material capacity coupling and are within the influence of the heat radiating from the exhaust conduit and muffler.

In thus positioning the parts, the aerial, which is in position to become wet from driving the automobile over wet roads or to become coated with ice in cold weather, is sufficiently influenced by the heat to maintain the same dry and free from ice and thus capable of properly functioning at all times.

The lead-in wire 9 extends to the radio set, indicated generally at 10, and is supported beneath the cowl 11 of the automobile. The radio set may be of any approved type adapted for use with the automobile and the shielded lead-in wire maintains this part of the aerial free from moisture and by shielding the same, a material capacity coupling is prevented between the said lead-in wire and the automobile frame along which it is mounted.

By the described arrangement of parts, an aerial may be simply mounted on the exhaust tube by the insulators such as are shown. For this purpose, the insulators have a body 12 and an arcuate base portion 13 extending each way from the body and where one or more insulators are placed, a band 14 may be placed about each end of the base portion to clamp the same in position on the exhaust conduit 1. The body portions 12 of the insulators are preferably formed with a groove about which the wire may be looped or otherwise secured to the insulator. The wire thus extends from any one of the insulators, as for instance like the loop portion 6, and this, at the far end from the lead-in wire 9, is passed from one insulator to another around the exhaust conduit and extends back in another loop as at 7 in parallel relation with the loop portion 6.

The aerial is preferably one continuous wire with the desired number of strands carried in parallel relation along the exhaust conduit and muffler to secure the desired length and capacity.

Thus there is no special form of exhaust conduit required to mount the aerial thereon, it only being necessary to secure the insulators to the exhaust conduit and/or muffler, for example, after the manner shown in Fig. 3.

From the foregoing description, it is believed evident that my improved aerial for automobile radios is of simple and inexpensive form; is readily applicable to the various forms and arrangement of the exhaust conduits and muffler constructon as used in different types of automobiles, and that the various objects and features of the invention are attained by the construction described.

Having thus briefly described my invention, its utility and mode of operation, what I claim and desire to secure by Letters Patent of the United States is—

1. An aerial for use in an automobile having a radio set, an engine, an exhaust conduit and a muffler, comprising an aerial wire extending longitudinally of the exhaust conduit and muffler in sufficiently closely spaced relation therewith to be heated by the heat radiating from the exhaust conduit and muffler to maintain the same in dry condition and free from ice, and a series of insulators secured to the exhaust conduit and muffler in spaced relation longitudinally thereof to which the aerial wire is connected and so positioned in respect to adjacent metal parts as to limit the capacity coupling therebetween.

2. An aerial for use in an automotive vehicle having a radio set, an engine, an exhaust conduit and a muffler, comprising a wire like conductor having a lead-in wire at one end extending to a radio set and extending along the exhaust conduit and muffler on one side and returning on the opposite side, a series of insulators each having a base attachable to the exhaust conduit and muffler, and clamping means for securing the same in place, said insulators having portions projecting outwardly from the base, the wire being wrapped about the projecting ends of the insulators and the insulators supporting the aerial sufficiently close to the exhaust conduit and muffler as to prevent an accumulation of water and ice thereon by the heat of the muffler and exhaust conduit.

LYLE C. ARMSTRONG.